US012441675B2

(12) United States Patent
Chang et al.

(10) Patent No.: US 12,441,675 B2
(45) Date of Patent: Oct. 14, 2025

(54) METHOD FOR PREPARING TEREPHTHALIC ACID, AND TEREPHTHALIC ACID PREPARED THEREFROM

(71) Applicant: SK CHEMICALS CO., LTD., Gyeonggi-do (KR)

(72) Inventors: Yu-Mi Chang, Gyeonggi-do (KR); Ju-Sik Kang, Gyeonggi-do (KR); Jeong Ho Park, Gyeonggi-do (KR); Hee-Il Chae, Gyeonggi-do (KR)

(73) Assignee: SK CHEMICALS CO., LTD., Gyeonggi-do (KR)

(*) Notice: Subject to any disclaimer, the term of this patent is extended or adjusted under 35 U.S.C. 154(b) by 0 days.

(21) Appl. No.: 18/726,819

(22) PCT Filed: Aug. 30, 2023

(86) PCT No.: PCT/KR2023/012907
§ 371 (c)(1),
(2) Date: Jul. 5, 2024

(87) PCT Pub. No.: WO2024/053928
PCT Pub. Date: Mar. 14, 2024

(65) Prior Publication Data
US 2025/0091978 A1    Mar. 20, 2025

(30) Foreign Application Priority Data

Sep. 5, 2022 (KR) .................. 10-2022-0112229
Jun. 28, 2023 (KR) .................. 10-2023-0083806

(51) Int. Cl.
C07C 51/09 (2006.01)
C07C 63/26 (2006.01)
C08G 63/183 (2006.01)

(52) U.S. Cl.
CPC .............. C07C 51/09 (2013.01); C07C 63/26 (2013.01); C08G 63/183 (2013.01)

(58) Field of Classification Search
USPC ................................................ 528/308.1
See application file for complete search history.

(56) References Cited

U.S. PATENT DOCUMENTS 5,095,145 A    3/1992    Rosen

FOREIGN PATENT DOCUMENTS

| AU | 2019219793 A1 | | 4/2020 |
|----|---------------|---|--------|
| JP | H03-261728 A | | 11/1991 |
| JP | 06157402 A | * | 6/1994 |
| JP | H06157402 A | | 6/1994 |
| JP | H06240046 A | | 8/1994 |
| JP | 2003-128599 A | | 5/2003 |
| JP | 2003-128626 A | | 5/2003 |
| JP | 2003-286219 A | | 10/2003 |
| JP | 2004-010528 A | | 1/2004 |
| JP | 2004-196742 A | | 7/2004 |
| JP | 2006083125 A | | 3/2006 |
| JP | 2008-524198 A | | 7/2008 |
| KR | 1019970042469 A | | 7/1997 |
| KR | 1020200046198 A | | 6/2020 |
| WO | 2006/085134 A1 | | 8/2006 |

OTHER PUBLICATIONS

JPH06157402A Machine Translation (Year: 1994).*
Office Action for Korean Patent Application No. 10-2023-0083806 issued by the Korean Patent Office on Sep. 24, 2023.
International Search Report for International Patent Application No. PCT/KR2023/012907 issued by the International Searching Authority (Korean Intellectual Property Office) on Nov. 29, 2023.
Extended European Search Report for European Patent Application No. 23863404.2 issued by the European Patent Office on Mar. 14, 2025.
Office Action for Japanese Patent Application No. 2024-547206 issued by the Japanese Patent Office on Feb. 26, 2025.

* cited by examiner

Primary Examiner — Terressa Boykin
(74) Attorney, Agent, or Firm — IP & T GROUP LLP

(57) ABSTRACT

The present invention relates to a method for preparing terephthalic acid, and terephthalic acid prepared therefrom. Specifically, according to one embodiment of the present invention, by including the step of hydrolyzing a compound prepared by depolymerizing a waste polyester using a specific hydrolysis catalyst, terephthalic acid can be prepared in an environmentally friendly manner, and high purity terephthalic acid can be provided.

15 Claims, No Drawings

METHOD FOR PREPARING TEREPHTHALIC ACID, AND TEREPHTHALIC ACID PREPARED THEREFROM

This application is a national stage application of PCT/KR2023/012907 filed on Aug. 30, 2023, which claims priorities of Korean patent application numbers 10-2022-0112229 and 10-2023-0083806 filed on Sep. 5, 2022, and Jun. 28, 2023, respectively. The disclosure of each of the foregoing applications is incorporated herein by reference in its entirety.

TECHNICAL FIELD

The present invention relates to a process for preparing terephthalic acid in an environmentally friendly manner using waste polyester and to recycled terephthalic acid prepared thereby.

BACKGROUND ART

Polyester is widely used as a material for beverage-filling containers, packaging films, audio and video films, and the like, or an industrial material such as medical fibers and tire cords, by virtue of its excellent mechanical strength, thermal resistance, transparency, and gas barrier properties. In particular, polyester sheets or plates have good transparency and excellent mechanical strength, so that they are widely used as raw materials for cases, boxes, partitions, shelves, panels, packaging materials, building materials, interior and exterior materials, and the like.

As waste of plastics such as polyester is generated globally at an unmanageable level every year, there is increasing interest in recycling waste polyester or regeneration processes using waste polyester. In addition, countries around the world have prepared regulations and plans for recycling waste plastic resources, including waste polyester. For example, regulations that require a recycled resin to be used at a certain ratio or more in packaging materials used in various fields are being discussed.

In particular, since polyethylene terephthalate (PET) has excellent properties in terms of thermal resistance, processability, transparency, and non-toxicity, it is widely used to manufacture a wide range of products such as films, fibers, bottles, and containers. However, most of them are landfilled or incinerated after use; thus, research on recycling or regeneration processes using them is continuing.

For example, Korean Laid-open Patent Publication No. 1997-0042469 discloses a technology for preparing terephthalic acid by hydrolyzing waste polyethylene terephthalate with an aqueous alkaline solution to obtain a slurry of alkali metal and alkali earth metal salts of terephthalic acid and neutralizing it with an acid. A terephthalic acid salt, rather than terephthalic acid, is produced as a result of the hydrolysis reaction, and a neutralization step by adding acid is necessary to convert it to terephthalic acid. There is a problem in that environmental pollutants are generated from the by-products formed as a result, or a large amount of acid treatment waste solutions is generated.

PRIOR ART DOCUMENT

Patent Document (Patent Document 1) Korean Laid-open Patent Publication No. 1997-0042469

DISCLOSURE OF INVENTION

Technical Problem

Accordingly, the present invention aims to provide a process for preparing terephthalic acid with high purity in an environmentally friendly manner by hydrolyzing a compound prepared by depolymerizing waste polyester using a specific hydrolysis catalyst, and recycled terephthalic acid prepared thereby.

Solution to Problem

The process for preparing terephthalic acid according to an embodiment of the present invention comprises hydrolyzing a compound prepared by depolymerizing waste polyester, wherein a hydrolysis catalyst used in the hydrolysis step comprises at least one cation selected from the group consisting of alkali metal ions of $Li^+$, $Na^+$, $K^+$, and $Cs^+$, alkaline earth metal ions of $Be^{2+}$, $Mg^{2+}$, $Ca^{2+}$, and $Ba^{2+}$, ammonium ions of $NH^{4+}$ and $NR^{4+}$ (where R is alkyl), and $Zn^{2+}$; or at least one anion selected from the group consisting of $OH^-$, $OR^-$ (where R is alkyl), $HCO_3^-$, $CO_3^{2-}$, benzoate ion ($C_7H_5O_2^-$), 4-alkoxycarbonylbenzoate ion, acetate ion, and terephthalate ion.

Recycled terephthalic acid according to another embodiment of the present invention is prepared according to the above process for preparing terephthalic acid and has a total metal content of less than 100 ppm when measured by inductively coupled plasma atomic emission spectroscopy (ICP-AES).

A polyester resin according to another embodiment of the present invention comprises the recycled terephthalic acid.

Advantageous Effects of Invention

As the process for preparing terephthalic acid according to an embodiment of the present invention comprises hydrolyzing a compound prepared by depolymerizing waste polyester using a hydrolysis catalyst, wherein the hydrolysis catalyst comprises at least one cation selected from the group consisting of alkali metal ions such as $Li^+$, $Na^+$, $K^+$, and $Cs^+$, alkaline earth metal ions such as $Be^{2+}$, $Mg^{2+}$, $Ca^{2+}$, and $Ba^{2+}$, ammonium ions such as $NH^{4+}$ and $NR^{4+}$ (where R is alkyl), and $Zn^{2+}$; or at least one anion selected from the group consisting of $OH^-$, $OR^-$ (where R is alkyl), $HCO_3^-$, $CO_3^{2-}$, benzoate ion ($C_7H_5O_2^{31}$), 4-alkoxycarbonylbenzoate ion, acetate ion, and terephthalate ion, not only can terephthalic acid be produced in an environmentally friendly manner, but terephthalic acid with high purity can also be produced.

Specifically, in the conventional alkaline hydrolysis reaction, solid terephthalic acid is not immediately produced, rather a terephthalic acid salt is produced, which requires an additional step of neutralizing it. In addition, there has been a problem in that acids such as sulfuric acid or hydrochloric acid used to neutralize terephthalic acid salts generate environmental pollutants such as $Na_2SO_4$ and NaCl as by-products or a large amount of acid treatment waste solutions.

In contrast, in the process for preparing terephthalic acid according to an embodiment of the present invention, as a hydrolysis catalyst comprising at least one cation selected from the group consisting of alkali metal ions such as $Li^+$, $Na^+$, $K^+$, and $Cs^+$, alkaline earth metal ions such as $Be^{2+}$, $Mg^{2+}$, $Ca^{2+}$, and $Ba^{2+}$, ammonium ions such as $NH^{4+}$ and $NR^{4+}$ (where R is alkyl), and $Zn^{2+}$; or at least one anion selected from the group consisting of $OH^-$, $OR^-$ (where R is alkyl), $HCO_3^-$, $CO_3^{2-}$, benzoate ion ($C_7H_5O_2^-$), 4-alkoxycarbonylbenzoate ion, acetate ion, and terephthalate ion is used in a minute amount, solid terephthalic acid can be directly produced without additional steps, unlike the conventional process. Thus, not only can the process be easily operated, but process costs can also be reduced. Further, as no environmental pollutants are generated, terephthalic acid can be prepared in a very environmentally friendly manner.

In addition, a process for preparing terephthalic acid has been used in which dimethyl terephthalate (DMT) or bis(2-hydroxyethyl) terephthalate (BHET) is prepared from waste polyester and then hydrolyzed. In such an event, metal catalysts such as iron, cobalt, manganese, nickel, or the like are used in the hydrolysis. As some of the terephthalic acid produced acts as an acid catalyst, an alcohol produced as a by-product in the hydrolysis reaction may be decomposed. Thus, there is a problem in that process costs increase or non-recyclable waste is generated.

Specifically, when metal catalysts such as iron, cobalt, manganese, nickel, or the like are used in hydrolysis, some of the terephthalic acid produced while the hydrolysis reaction is carried out dissolves in water and acts as an acid catalyst, which may cause an alcohol produced as a by-product in the hydrolysis reaction to be dehydrated to produce additional by-products such as dialkyl ethers and alkenes. Thus, not only does the recovery rate of an alcohol decrease, but non-recyclable waste is also generated, or a process to remove additional by-products is required in order to recycle the alcohol, resulting in increased process costs.

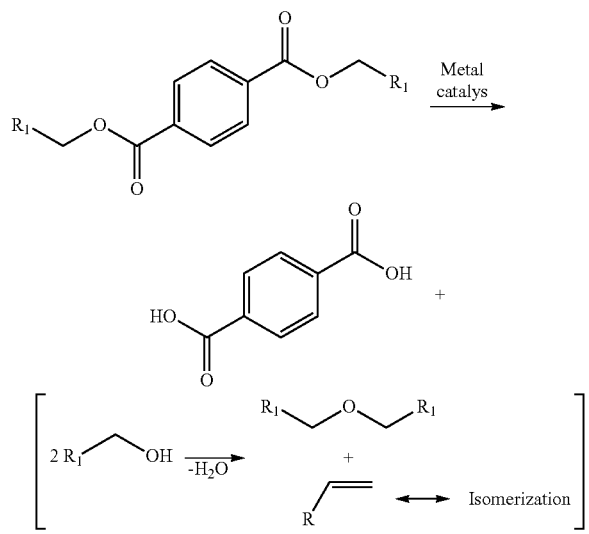

In contrast, in the process for preparing terephthalic acid according to an embodiment of the present invention, as a hydrolysis catalyst comprising at least one cation selected from the group consisting of alkali metal ions such as $Li^+$, $Na^+$, $K^+$, and $Cs^+$, alkaline earth metal ions such as $Be^{2+}$, $Mg^{2+}$, $Ca^{2+}$, and $Ba^{2+}$, ammonium ions such as $NH^{4+}$ and $NR^{4+}$ (where R is alkyl), and $Zn^{2+}$; or at least one anion selected from the group consisting of $OH^-$, $OR^-$ (where R is alkyl), $HCO_3^-$, $CO_3^{2-}$, benzoate ion ($C_7H_5O_2^-$), 4-alkoxycarbonylbenzoate ion, acetate ion, and terephthalate ion is used, some of the terephthalic acid produced as the hydrolysis reaction is carried out does not act as an acid catalyst; thus, the decomposition rate of an alcohol can be lowered.

BEST MODE FOR CARRYING OUT THE INVENTION

Hereinafter, the present invention will be described in detail. The present invention is not limited to the disclosures given below, but it may be modified into various forms as long as the gist of the invention is not changed.

Throughout the present specification, when a part is referred to as "comprising" an element, it is understood that other elements may be comprised, rather than other elements are excluded, unless specifically stated otherwise.

All numbers and expressions related to the quantities of components, reaction conditions, and the like used herein are to be understood as being modified by the term "about," unless otherwise indicated.

Throughout the present specification, the terms first, second, and the like are used to describe various components. But the components should not be limited by the terms. The terms are used only for the purpose of distinguishing one component from another.

Process for Preparing Terephthalic Acid

The process for preparing terephthalic acid according to an embodiment of the present invention comprises hydrolyzing a compound prepared by depolymerizing waste polyester, wherein a hydrolysis catalyst used in the hydrolysis step comprises at least one cation selected from the group consisting of alkali metal ions such as $Li^+$, $Na^+$, $K^+$, and $Cs^+$, alkaline earth metal ions such as $Be^{2+}$, $Mg^{2+}$, $Ca^{2+}$, and $Ba^{2+}$, ammonium ions such as $NH^{4+}$ and $NR^{4+}$ (where R is alkyl), and $Zn^{2+}$; or at least one anion selected from the group consisting of $OH^-$, $OR^-$ (where R is alkyl), $HCO_3^-$, $CO_3^{2-}$, benzoate ion ($C_7H_5O_2^{2-}$), 4-alkoxycarbonylbenzoate ion, acetate ion, and terephthalate ion.

R may be an alkyl group with 1 to 10 carbon atoms or an alkyl group with 1 to 5 carbon atoms.

The waste polyester may be obtained by crushing or melting waste polyester products. For example, the waste polyester may be obtained by crushing polyester products that have been used up and recovered and separated, or converting them into pellets (post consumer recycled material; PCR), or polyester waste (post industrial recycled material; PIR) such as defective products or scraps that may be formed during processes such as molding of polyester films, fibers, containers, or the like, but it is not limited thereto.

Specifically, the hydrolysis catalyst may comprise at least one selected from the group consisting of NaOH, $NaHCO_3$, $Na_2CO_3$, NaOMe, KOH, $K_2CO_3$, KOtBu, CsOH, $Ca(OH)_2$, LiOH, and $NH_4OH$.

As a specific hydrolysis catalyst as enumerated above is used, some of the terephthalic acid produced does not act as an acid catalyst; thus, the decomposition rate of an alcohol can be lowered. For example, when a hydrolysis catalyst such as NaOH is used, unlike the prior art in which some of the terephthalic acid produced acts as an acid catalyst, it is converted to a TPA-Na salt, which is dissolved in the water used in the hydrolysis reaction. Thus, it is possible to effectively prevent the decomposition of an alcohol as a by-product of the hydrolysis reaction.

Even in the process for preparing terephthalic acid according to an embodiment of the present invention, an alcohol of $R_1$—OH (where R is an alkyl group with 2 or more carbon atoms) may be formed as a by-product of the hydrolysis reaction. For dimethyl terephthalate, methanol may be formed. For bis(2-hydroxyethyl) terephthalate, ethylene glycol may be formed. However, as a specific hydrolysis catalyst is used in the process for preparing terephthalic acid according to an embodiment of the present invention, the decomposition rate of the alcohol, methanol, and ethylene glycol is very low as compared with the prior art; thus, the generation rate of alcohol by-products is low.

In addition, the amount of the hydrolysis catalyst used may be 0.01 mole to 1.0 mole based on 1 mole of the compound. For example, the amount of the hydrolysis catalyst used may be 0.02 mole to 1.0 mole, 0.02 mole to 0.8 mole, 0.03 mole to 0.5 mole, 0.05 mole to 0.4 mole, or 0.05 mole to 0.2 mole, based on 1 mole of the compound prepared by depolymerizing waste polyester.

In addition, water may be added in hydrolysis step. Specifically, water may be added in an amount of 1 to 500 times the weight of the compound in the hydrolysis step. For example, the amount of water added in the hydrolysis step may be 1 to 450 times, 1 to 400 times, 1 to 250 times, 1 to 100 times, 1.2 to 50 times, or 1.5 to 30 times the weight of the compound.

In addition, the hydrolysis may be carried out at 180° C. to 280° C. for 0.5 hour to 24 hours. For example, the hydrolysis may be carried out at a temperature of 185° C. to 280° C., 200° C. to 275° C., 220° C. to 270° C., or 240° C. to 265° C., for 1 hour to 20 hours, 2.5 hours to 12 hours, or 3 hours to 8 hours.

The conventional method in which a metal catalyst such as iron, cobalt, manganese, or nickel is added to waste polyester, which is then directly hydrolyzed with water, is environmentally friendly. However, processability is low in that very high-temperature conditions of 300° C. or higher are required, and the reaction apparatus must also have high-pressure resistance. In contrast, the process for preparing terephthalic acid according to an embodiment of the present invention has excellent processability since the process conditions are ameliorated as compared with the prior art.

According to an embodiment of the present invention, solid terephthalic acid may be prepared through the hydrolysis reaction. Specifically, the process may further comprise, after the hydrolysis step, filtering, washing, and drying the hydrolysis reaction product prepared by the hydrolysis reaction. That is, the hydrolysis reaction product prepared through the hydrolysis reaction may be filtered, washed, and dried to produce solid terephthalic acid.

For example, the hydrolysis reaction product may be cooled to an appropriate temperature, for example, from room temperature to less than 100° C., at which water does not vaporize, to obtain a solution in the form of a slurry, which is filtered to obtain a solid, which is washed and dried under vacuum to obtain solid terephthalic acid.

The washing may be carried out using a mixture of an alcohol having 4 or more carbon atoms and/or water, a protic solvent such as isopropanol and acetic acid, or an aprotic solvent such as acetone, dichloromethane, chloroform, tetrahydrofuran (THF), and toluene.

Residual pigments or impurities generated by the decomposition of pigments during hydrolysis, especially yellow impurities, can be effectively removed through the washing, thereby enhancing yellow index or color characteristics. In addition, as water is used for washing, mineral salts can be removed, thereby enhancing quality.

For example, the solid obtained by filtration may be washed with a mixture of alcohol at 80° C. to 150° C. and/or water at 70° C. to 95° C.

According to an embodiment of the present invention, the compound prepared by depolymerizing waste polyester may be a compound represented by Formula 1.

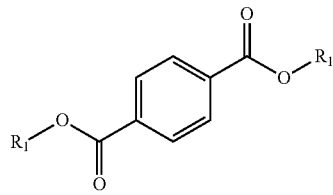

[Formula 1]

In Formula 1, $R_1$ is a substituted or unsubstituted alkyl group.

Specifically, $R_1$ may be an alkyl group unsubstituted or substituted with a hydroxy group. For example, the compound may be dimethyl terephthalate (DMT), dibutyl terephthalate (DBTP), diisooctyl terephthalate (DOTP), or bis(2-hydroxyethyl) terephthalate (BHET).

For example, dimethyl terephthalate may be prepared by performing a methanolysis reaction of waste polyester. Bis(2-hydroxyethyl) terephthalate may be prepared by performing a glycolysis reaction of waste polyester. In addition, commercial products may be used as the dimethyl terephthalate and bis(2-hydroxyethyl) terephthalate.

Alternatively, in Formula 1, $R_1$ may be a substituted or unsubstituted alkyl group having 2 or more carbon atoms.

For example, $R_1$ may be methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, hexyl, 1-methylhexyl, 2-ethyl-1-hexyl, heptyl, n-heptyl, 1-methylheptyl, octyl, n-octyl, isooctyl, tert-octyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, decanyl, undecanyl, dodecanyl, tridecanyl, or tetradecanyl.

According to an embodiment of the present invention, an alcohol may be produced as a by-product in the hydrolysis step. Specifically, the decomposition rate of the alcohol may be less than 10%. For example, the decomposition rate (%) of an alcohol may be calculated by analyzing the components of the filtrate obtained by filtering the hydrolysis reaction product in the form of a slurry obtained through hydrolysis using gas chromatography. The decomposition rate of the alcohol may be 9% or less, 6% or less, 5% or less, 4.5% or less, 4% or less, 3% or less, or 2% or less. In the process for preparing terephthalic acid according to an embodiment of the present invention, not only is the decomposition rate of an alcohol low, but it is also environmentally friendly in that the alcohol can be recovered and reused, and process costs can also be reduced.

According to another embodiment of the present invention, the depolymerization may comprise alcoholysis.

Specifically, the alcoholysis may be carried out using an alcohol having 4 or more carbon atoms. In particular, when the compound is prepared by subjecting waste polyester to alcoholysis with an alcohol having 4 or more carbon atoms, the compound may be liquid at room temperature.

When a compound is prepared by subjecting waste polyester to alcoholysis with an alcohol having 4 or more carbon atoms, the compound is liquid at room temperature. Thus, insoluble impurities and additives such as colorants and pigments that may be contained in waste polyester can be easily removed. Thus, the purity and yield of terephthalic acid produced can be enhanced.

In addition, since solid terephthalic acid can be directly produced without performing an additional neutralization step, unlike the conventional process, processability is excellent, along with environmental friendliness. Further, not only is it easy to separate and recover ethylene glycol, which may be formed as a by-product during the preparation process, but the alcohol with 4 or more carbon atoms used in the alcoholysis reaction can also be readily separated and reused, resulting in excellent process cost reduction effect. In addition, processability and economic efficiency can be further enhanced in that purification and transfer processes other than reaction can be carried out at room temperature or low temperatures.

For example, the alcoholysis may be first carried out by charging waste polyester, an alcohol with 4 or more carbon atoms, and a very minute amount of an alcoholysis catalyst to a first high-pressure reactor. Ethylene glycol, which is a by-product formed as the alcoholysis reaction is carried out, and unreacted alcohol (alcohol present in excess) can be recovered through a separate fractional distillation apparatus upon completion of the reaction and reused.

In addition, ethylene glycol formed during the reaction and unreacted alcohol may be discharged in the form of a gaseous mixture in real-time during the reaction, which is then condensed using an external cooling device and recovered. In such an event, an alcohol may be continuously fed to the high-pressure reactor at the same volume and feeding rate as the volume and discharge rate of the discharged gaseous mixture. The unreacted alcohol can be separated from the discharged gaseous mixture through a simple process such as fractional distillation or layer separation. The unreacted alcohol thus separated can be fed to the first high-pressure reactor again, and ethylene glycol can be recovered therefrom.

Thereafter, the liquid alcoholysis product obtained through the alcoholysis reaction can be purified by cooling, adsorption, and filtration. The purified alcoholysis reaction composition, together with water, is fed to a second high-pressure reactor to carry out a hydrolysis reaction, and a slurry-type solution is then obtained and filtered to obtain solid terephthalic acid. In such an event, a small amount of a hydrolysis catalyst may be additionally fed along with water before the hydrolysis reaction. The hydrolysis catalyst may be the same as, or different from, the alcoholysis catalyst.

In addition, upon completion of the hydrolysis reaction, the unreacted components are recovered and reintroduced into the alcoholysis or hydrolysis reaction for reaction one or more times, thereby enhancing the yield of the terephthalic acid finally produced. Further, the amount of waste generated can be reduced, making it environmentally friendly. For example, the filtrate obtained by filtering the excess unreacted alcohol (having 4 or more carbon atoms) and ethylene glycol as a by-product using a filter or the like can be reintroduced into the hydrolysis reaction.

The alcoholysis reaction can be smoothly carried out as a non-catalytic reaction without using an alcoholysis catalyst, making it environmentally friendly. In particular, when the content of insoluble metals in waste polyester is high, a non-catalytic reaction may be advantageous for efficient treatment and removal of impurities. Alternatively, an alcoholysis catalyst may be added in the alcoholysis reaction. Specifically, an alcoholysis catalyst may be added from the viewpoint of energy to enhance processability by improving reactivity.

The alcoholysis catalyst may be a metal acetate salt, an alkali metal salt, or a hydroxy salt.

More specifically, the alcoholysis catalyst may comprise at least one cation selected from the group consisting of alkali metal ions such as $Li^+$, $Na^+$, $K^+$, and $Cs^+$, alkali earth metal ions such as $Be^{2+}$, $Mg^{2+}$, $Ca^{2+}$, and $Ba^{2+}$, ammonium ions such as $NH_4^+$ and $NR_4^+$ (where R is alkyl), and $Zn^{2+}$; or at least one anion selected from the group consisting of $OH^-$, $OR^-$ (where R is alkyl), $HCO_3^-$, $CO_3^{2-}$, benzoate ion ($C_7H_5O^{2-}$), 4-alkoxycarbonylbenzoate ion, acetate ion, and terephthalate ion. R may be an alkyl group with 1 to 10 carbon atoms or an alkyl group with 1 to 5 carbon atoms.

For example, the alcoholysis catalyst may comprise at least one selected from the group consisting of $Zn(OAc)_2$, $Co(OAc)_2$, $Mn(OAc)_2$, $Mg(OAc)_2$, $Ca(OAc)_2$, $Ba(OAc)_2$, LiOAc, NaOAc, KOAc, $Zn(OAC)_2 \cdot 2H_2O$, $Co(OAc)_2 \cdot 4H_2O$, $Pb(OAc)_2$, $Mn(OAc)_2 \cdot 4H_2O$, $Mg(OAc)_2 \cdot 4H_2O$, $Pd(OAc)_2$, $Ti(OBu)_4$, $Ti(OiPr)_4$, $GeO_2$, $Al(OiPr)_3$, $Na_2CO_3$, $K_2CO_3$, dibutyltin(IV) oxide, stannous octoate, titanium phosphate, and terephthalic acid.

In addition, the amount of the alcoholysis catalyst added may be 10 ppm to 10,000 ppm based on the total weight of the waste polyester. For example, the amount of the alcoholysis catalyst added may be 10 ppm to 9,000 ppm, 15 ppm to 8,000 ppm, 20 ppm to 6,000 ppm, 50 ppm to 3,500 ppm, 100 ppm to 1,500 ppm, 150 ppm to 1,000 ppm, 180 ppm to 500 ppm, or 200 ppm to 450 ppm, based on the total weight of the waste polyester.

According to another embodiment of the present invention, the alcoholysis may comprise discharging the unreacted alcohol and ethylene glycol as a by-product.

Specifically, the alcohol is separated from the discharged mixture of alcohol and ethylene glycol, and the separated alcohol may be recycled as a raw material for the alcoholysis. For example, ethylene glycol as a by-product formed in the alcoholysis and unreacted alcohol (alcohol present in excess) are subjected to fractional distillation or layer separation during the alcoholysis reaction and/or upon completion of the alcoholysis reaction to separate alcohol. The separated alcohol may be introduced into the alcoholysis and reused. In such an event, the volume and feed rate of the alcohol introduced for reuse may be the same as the volume and discharge rate of the mixture of alcohol and ethylene glycol discharged.

In addition, the number of carbon atoms of the alcohol used in the alcoholysis may be 4 or more, 6 or more, 8 or more, 10 or more, or 12 or more, and may be 4 to 14, 4 to 13, 4 to 10, 4 to 8, 6 to 12, 8 to 14, or 8 to 13.

As the alcoholysis of waste polyester is carried out using an alcohol having the above number of carbon atoms, the alcoholysis can be carried out at a lower temperature and pressure as compared with the conventional process using waste polyester that is carried out at a high temperature and a high pressure, an alcoholysis product, that is, the above compound, can be produced in a liquid form. In addition, as the number of carbon atoms of the alcohol satisfies the above range, the alcoholysis reaction rate can be enhanced.

In addition, the alcohol may have a boiling point of 100° C. to 290° C. For example, the boiling point of the alcohol may be 100° C. to 280° C., 100° C. to 260° C., 100° C. to 230° C., 110° C. to 190° C., or 180° C. to 290° C. As the boiling point of the alcohol satisfies the above range, ethylene glycol formed as a by-product in the alcoholysis can be more easily removed or recovered in the subsequent process, thereby further enhancing processability. In particular, there has been a trend in recent years to use various monomer materials in the field in which polyester is used as a raw material; thus, it can be readily adopted for removing various dialcohol-type monomers used in waste polyester products such as waste plastic products.

The weight ratio of the waste polyester to the alcohol may be 1:1 to 10. For example, the weight ratio of the waste polyester to the alcohol may be 1:1 to 8, 1:1 to 6, 1:1 to 4, 1:1 to 3.5, 1:1.1 to 3.3, 1:2 to 4, or 1:2 to 3.5.

In addition, the alcoholysis reaction may be carried out at a temperature of 160° C. to 280° C. and a pressure of 1 bar to 40 bar for 0.5 hour to 24 hours. For example, the alcoholysis reaction may be carried out at a temperature of 165° C. to 280° C., 165° C. to 270° C., 180° C. to 270° C., 190° C. to 250° C., 200° C. to 265° C., 220° C. to 265° C., 240° C. to 260° C., or 245° C. to 260° C. and a pressure of 1 bar to 38 bar, 1 bar to 33 bar, 1 bar to 28 bar, 1 bar to 24 bar, 2 bar to 40 bar, 3 bar to 35 bar, or 5 bar to 30 bar for 0.5 hour to 22 hours, 1 hour to 15 hours, 1.5 hours to 10 hours, 2 hours to 8 hours, or 2 hours to 6 hours.

An alcoholysis catalyst may be added in the alcoholysis reaction. Specifically, before performing alcoholysis reaction, the alcoholysis catalyst may be added to the mixture of the waste polyester and the alcohol from the viewpoint of energy to enhance processability by improving reactivity.

The alcoholysis catalyst may be a metal acetate salt, an alkali metal salt, or a hydroxy salt.

More specifically, the alcoholysis catalyst may comprise at least one cation selected from the group consisting of alkali metal ions such as $Li^+$, $Na^+$, $K^+$, and $Cs^+$, alkali earth metal ions such as $Be^{2+}$, $Mg^{2+}$, $Ca^{2+}$, and $Ba^{2+}$, ammonium ions such as $NH^{4+}$ and $NR^{4+}$ (where R is alkyl), and $Zn^{2+}$; or at least one anion selected from the group consisting of $OH^-$, $OR^-$ (where R is alkyl), $HCO_3^-$, $CO_3^{2-}$, benzoate ion ($C_7H_5O^{2-}$), 4-alkoxycarbonylbenzoate ion, acetate ion, and terephthalate ion. R may be an alkyl group with 1 to 10 carbon atoms or an alkyl group with 1 to 5 carbon atoms.

For example, the alcoholysis catalyst may comprise at least one selected from the group consisting of $Zn(OAC)_2$, $Co(OAc)_2$, $Mn(OAc)_2$, $Mg(OAc)_2$, $Ca(OAc)_2$, $Ba(OAc)_2$, LiOAc, NaOAc, KOAc, $Zn(OAC)_2·2H_2O$, $Co(OAc)_2·4H_2O$, $Pb(OAc)_2$, $Mn(OAc)_2·4H_2O$, $Mg(OAc)_2·4H_2O$, $Pd(OAc)_2$, $Ti(OBu)_4$, $Ti(OiPr)_4$, $GeO_2$, $Al(OiPr)_3$, $Na_2CO_3$, $K_2CO_3$, dibutyltin(IV) oxide, stannous octoate, titanium phosphate, and terephthalic acid.

In addition, the amount of the alcoholysis catalyst added may be 10 ppm to 10,000 ppm based on the total weight of the waste polyester. For example, the amount of the alcoholysis catalyst added may be 10 ppm to 9,000 ppm, 15 ppm to 8,000 ppm, 20 ppm to 6,000 ppm, 50 ppm to 3,500 ppm, 100 ppm to 1,500 ppm, 150 ppm to 1,000 ppm, 180 ppm to 500 ppm, or 200 ppm to 450 ppm, based on the total weight of the waste polyester.

The alcoholysis reaction can be smoothly carried out as a non-catalytic reaction without using an alcoholysis catalyst, making it environmentally friendly. In particular, when the content of insoluble metals in waste polyester is high, a non-catalytic reaction may be advantageous for efficient treatment and removal of impurities.

According to another embodiment of the present invention, the process may further comprise purifying the compound before the hydrolysis step.

Specifically, the purification step may comprise adding at least one adsorbent selected from the group consisting of activated carbon, silica gel, alumina, zeolite, and activated clay, or adsorbing through bed adsorption. More specifically, the adsorbent may be activated carbon or a mixture of activated carbon and silica gel. For example, the adsorbent may be a mixture of activated carbon and silica gel at a weight ratio of 1:0.5 to 1.5 or 1:0.8 to 1.2, but it is not limited thereto.

The content of the adsorbent added may be 0.1% by weight to 20% by weight based on the total weight of the compound. For example, the content of the adsorbent added may be 0.1% by weight to 18% by weight, 0.1% by weight to 15% by weight, 0.1% by weight to 10% by weight, 0.1% by weight to 5% by weight, or 0.1% by weight to 2% by weight, based on the total weight of the compound.

As the step of purifying the compound using the adsorbent, specifically using the adsorbent that satisfies the specific feed amount within the above numerical range, is further carried out, purity and yield can be further enhanced. Specifically, as the step of purifying the compound is carried out, it is possible to more effectively remove insoluble impurities such as metals that may be contained in the compound, or additives such as colorants and pigments that may be contained in waste polyester. Thus, the purity and yield of the terephthalic acid finally prepared can be further enhanced.

In addition, a concentration step may be further carried out after the purification step.

The concentration may be carried out at a temperature of 50° C. to 120° C. for 0.5 hour to 6 hours. For example, the concentration may be carried out at a temperature of 55° C. to 115° C., 60° C. to 110° C., 65° C. to 105° C., or 75° C. to 100° C. for 1 hour to 5 hours, 1.5 hours to 4 hours, or 2 hours to 4 hours by stirring the purified compound.

In addition, the purified compound may have a low content of insoluble impurities such as metals. Specifically, the purified compound may have a total metal content of 100 ppm or less relative to the total weight of the purified compound when measured by inductively coupled plasma atomic emission spectroscopy (ICP-AES).

For example, the purified compound may contain insoluble impurities such as metals. The total content of metals in the purified compound may be 80 ppm or less, 70 ppm or less, 60 ppm or less, 50 ppm or less, 40 ppm or less, or less than 30 ppm, relative to the total weight of the purified compound, when measured by inductively coupled plasma atomic emission spectroscopy (ICP-AES). In particular, the total content of Sb, Ti, and Zn may be less than 30 ppm, 25 ppm or less, 20 ppm or less, 15 ppm or less, 10 ppm or less, 5 ppm or less, 3 ppm or less, or 1 ppm or less.

Sb is known to be a widely used catalyst in the polymerization of common polyester by virtue of its excellent stability, reaction rate, and cost. As regulations are being strengthened due to the impact of Sb on the human body and the environment, however, it is a substance that must be removed during the chemical recycling process.

In addition, Ti may be used as a catalyst for polyester polymerization or as an additive in polyester processing in the form of $TiO_2$. If it is contained in a certain amount or more, the quality of recycled terephthalic acid prepared therefrom or a polyester resin using it may deteriorate, thereby limiting its use.

Zn is also a component used as a polymerization catalyst for PET. If it remains, it may affect the control of reactivity in the preparation process of recycled terephthalic acid or a polyester resin using it. Thus, it is preferable to be removed. In particular, since it is widely used in the chemical recycling process, it is a substance that requires sufficient removal of the amount contained in waste plastic, which is the raw material for the present process, as well as the amount separately added as a catalyst during the recycling process.

According to an embodiment of the present invention, as the purification is further carried out, the total content of metals, especially Sb, Ti, and Zn as described above, in the purified compound is very low at 30 ppm or less.

For example, the content of Sb may be 30 ppm or less, 20 ppm or less, 10 ppm or less, or 1 ppm or less, relative to the total weight of the purified compound when measured by inductively coupled plasma atomic emission spectroscopy (ICP-AES).

The content of Ti may be 30 ppm or less, 20 ppm or less, 10 ppm or less, or 1 ppm or less, relative to the total weight of the purified compound when measured by inductively coupled plasma atomic emission spectroscopy (ICP-AES).

The content of Zn may be 30 ppm or less, 20 ppm or less, 10 ppm or less, or 1 ppm or less, relative to the total weight of the purified compound when measured by inductively coupled plasma atomic emission spectroscopy (ICP-AES).

In addition, the yield of terephthalic acid may be 80% or more based on the total weight of the compound prepared by depolymerizing waste polyester. For example, the yield of terephthalic acid may be 82% or more, 85% or more, 87% or more, 88% or more, 89% or more, 90% or more, 91% or more, 92% or more, 94% or more, 95% or more, or 96% or more, based on the total weight of the compound prepared by depolymerizing waste polyester.

Recycled Terephthalic Acid

Recycled terephthalic acid according to another embodiment of the present invention is prepared according to the above process for preparing terephthalic acid and has a total metal content of less than 100 ppm when measured by inductively coupled plasma atomic emission spectroscopy (ICP-AES).

Specifically, the recycled terephthalic acid may be prepared according to the process for preparing terephthalic acid.

The recycled terephthalic acid may have a total metal content of less than 100 ppm, 90 ppm or less, 80 ppm or less, 65 ppm or less, 50 ppm or less, 35 ppm or less, less than 30 ppm, less than 20 ppm, 15 ppm or less, 9 ppm or less, 7 ppm or less, 5 ppm or less, or 1 ppm or less, when measured by inductively coupled plasma atomic emission spectroscopy (ICP-AES).

In addition, the recycled terephthalic acid may have a total content of Sb, Ti, and Zn of less than 30 ppm when measured by inductively coupled plasma atomic emission spectroscopy (ICP-AES). For example, the total content of Sb, Ti, and Zn, which may be harmful to the human body or have the potential to be used as a catalyst for reaction or side reaction in the subsequent polymerization process, in the recycled terephthalic acid may be 25 ppm or less, 20 ppm or less, 15 ppm or less, 10 ppm or less, 5 ppm or less, 3 ppm or less, or 1 ppm or less.

For example, the content of Sb in the recycled terephthalic acid may be 30 ppm or less, 25 ppm or less, 20 ppm or less, 15 ppm or less, 10 ppm or less, 6 ppm or less, 5 ppm or less, 4 ppm or less, 3 ppm or less, 2 ppm or less, or 1 ppm or less, relative to the total weight of the recycled terephthalic acid, when measured by inductively coupled plasma atomic emission spectroscopy (ICP-AES).

The content of Ti in the recycled terephthalic acid may be 30 ppm or less, 25 ppm or less, 20 ppm or less, 15 ppm or less, 10 ppm or less, 5 ppm or less, 3 ppm or less, or 1 ppm or less, relative to the total weight of the recycled terephthalic acid, when measured by inductively coupled plasma atomic emission spectroscopy (ICP-AES).

The content of Zn in the recycled terephthalic acid may be 30 ppm or less, 25 ppm or less, 15 ppm or less, 10 ppm or less, 6 ppm or less, 5 ppm or less, 4 ppm or less, 3 ppm or less, 2 ppm or less, or 1 ppm or less, relative to the total weight of the recycled terephthalic acid, when measured by inductively coupled plasma atomic emission spectroscopy (ICP-AES).

The recycled terephthalic acid may have a color-b of less than 2, 1.6 or less, 1.4 or less, 1.3 or less, or 1 or less, as measured with a colorimeter. Since the above numerical range of color-b is equivalent to that of virgin terephthalic acid commonly produced in the petrochemical process, the recycled terephthalic acid that satisfies the above range of color-b is not only low in yellow index but also excellent in quality as the monomer is well purified.

Col-b is a color coordinate established by the Commission International d'Eclairage (CIE), where color is represented by L (brightness), a (green to red complementary color), and b (yellow to blue complementary color). It can be measured using a colorimeter.

In addition, the yellow index (Y.I.) may be less than 2, 1.8 or less, or 1.7 or less when the recycled terephthalic acid is diluted to a concentration of 5% in dimethyl sulfoxide (DMSO), dimethyl formamide (DMF), and methylpyrrolidone (NMP), respectively, and measured.

Polyester Resin and Process for Preparing the Same

A polyester resin according to another embodiment of the present invention comprises the recycled terephthalic acid.

Specifically, the polyester resin may comprise the recycled terephthalic acid, a diol compound or a derivative thereof, and optionally a dicarboxylic acid compound or a derivative thereof.

For example, the diol component or a derivative thereof may comprise at least one selected from the group consisting of ethylene glycol, monoethylene glycol, diethylene glycol, 1,4-butanediol, 1,3-propanediol, 1,4-cyclohexanedimethanol, and neopentyl glycol. The dicarboxylic acid or a derivative thereof may comprise at least one selected from the group consisting of terephthalic acid (TPA), isophthalic acid (IPA), 2,6-naphthalenedicarboxylic acid (2,6-NDA), dimethyl terephthalate (DMT), dimethylisophthalate (DMI), and dimethyl 2,6-naphthalenedicarboxylate (2,6-NDC). But they are not limited thereto.

The process for preparing a polyester resin according to another embodiment of the present invention comprises mixing the recycled terephthalic acid with a diol compound or a derivative thereof, and optionally a dicarboxylic acid compound or a derivative thereof, and then carrying out an esterification reaction; and subjecting the esterification reaction product to a polycondensation reaction.

The esterification reaction may be carried out at a temperature of 200° C. to 350° C., 220° C. to 320° C., or 250° C. to 290° C. In addition, the esterification reaction may be carried out in a pressurized state higher than normal pressure by 0 kg/cm$^2$ to 10 kg/cm$^2$ (0 mmHg to 7,355.6 mmHg), 0 kg/cm$^2$ to 5 kg/cm$^2$ (0 to 3,677.8 mmHg) or 0 kg/cm$^2$ to 2.0 kg/cm$^2$ (0 to 1,471.1 mmHg). In addition, the esterification reaction may be carried out for 1 hour to 24 hours, 1 hour to 10 hours, or 1 hour to 6 hours.

In addition, the polycondensation reaction may be carried out at a temperature of 150° C. to 400° C., 200° C. to 370° C., 250° C. to 350° C., or 270° C. to 300° C. In addition, the polycondensation reaction may be carried out at a reduced pressure of 0.01 mmHg to 400 mmHg, 0.05 mmHg to 100 mmHg, or 0.1 mmHg to 100 mmHg. In addition, the polycondensation reaction may be carried out for the required time until the desired intrinsic viscosity is reached. For example, it may be carried out for 1 hour to 24 hours, 1 hour to 10 hours, or 1 hour to 4 hours.

In addition, a catalyst and/or a stabilizer may be further added in the esterification reaction and the polycondensation reaction.

For example, the catalyst for an esterification reaction may be methylates of sodium and magnesium; acetates, borates, fatty acid salts, and carbonates of Zn, Cd, Mn, Co, Ca, and Ba; metallic Mg; and oxides of Pb, Zn, Sb, and Ge.

In addition, the catalyst for polycondensation reaction may be, for example, titanium-based catalysts such as tetraethyl titanate, acetyl tripropyl titanate, tetrapropyl titanate, tetrabutyl titanate, polybutyl titanate, 2-ethylhexyl titanate, octylene glycol titanate, lactate titanate, triethanolamine titanate, acetyl acetonate titanate, ethyl acetoacetic ester titanate, isostearyl titanate, titanium dioxide, titanium dioxide/silicon dioxide copolymers, titanium dioxide/zirconium dioxide copolymers; germanium-based catalysts such as germanium dioxide and copolymers using the same; or tin-based catalysts such as monobutyltin oxide, dibutyltinoxide, and monobutylhydroxytinoxide.

In addition, the stabilizer may be a phosphorus-based compound such as phosphoric acid, trimethyl phosphate, and triethyl phosphate may be used, but it is not limited thereto.

The process for preparing a polyester resin according to another embodiment of the present invention may further comprises carrying out a solid-state polymerization reaction. For example, the solid-state polymerization may be carried out after the polycondensation reaction at a temperature of 190° C. to 230° C. under vacuum conditions of 0.2 Torr to 2.0 Torr or a nitrogen atmosphere.

MODE FOR THE INVENTION

Hereinafter, the present invention will be described in more detail with reference to the following examples. However, these examples are set forth to illustrate the present invention, and the scope of the present invention is not limited thereto.

EXAMPLE

Preparation Example 1-1

A first high-pressure reactor with a capacity of 7 liters was charged with 1 kg of waste polyethylene terephthalate (waste PET) and 3.3 kg of 1-butanol, followed by an addition thereto of 200 mg of $Zn(OAC)_2 \cdot 2H_2O$ as an alcoholysis catalyst (200 ppm relative to the total weight of the waste PET).

Thereafter, with all connections of the first high-pressure reactor tightened and sealed, the temperature was raised to 250° C. over 1 hour. An alcoholysis reaction was carried out with stirring for 4 hours while a temperature of 250° C. was maintained. Upon completion of the alcoholysis reaction, it was cooled to room temperature.

Thereafter, 5 g of activated carbon was added as an adsorbent to 500 g of the alcoholysis reaction product, which was stirred at 100° C. for 3 hours and then filtered using a Buchner funnel and concentrated to obtain liquid dibutyl terephthalate (DBTP).

Preparation Example 1-2

Liquid diisooctyl terephthalate (DOTP) was obtained in the same manner as in Preparation Example 1-1, except that 2-ethyl-1-hexanol was used instead of 1-butanol.

Preparation of Terephthalic Acid

Example 1

A second high-pressure reactor with a capacity of 600 ml was charged with 72.4 g (0.26 mole) of liquid dibutyl terephthalate (DBTP) prepared in Preparation Example 1-1 and 200 g (11.10 moles) of water, followed by an addition thereto of 1.02 g (0.026 mole, 0.1 mole based on 1 mole of DBTP) of NaOH as a hydrolysis catalyst.

Thereafter, the temperature of the second high-pressure reactor was raised to 260° C., and a hydrolysis reaction was carried out for 4 hours while a temperature of 260° C. was maintained, followed by cooling to room temperature to obtain a hydrolysis reaction product in the form of a slurry. The hydrolysis reaction product in the form of a slurry was filtered to obtain a solid, which was washed with butanol (about 90° C.) and water (about 90° C.) and dried under vacuum to obtain 40.6 g (yield: 94%) of solid terephthalic acid (TPA). Here, the decomposition rate (%) was calculated by analyzing the components of the filtrate using gas chromatography.

Example 2

36.7 g (yield: 85%) of solid terephthalic acid (TPA) was obtained in the same manner as in Example 1, except that 100 g (0.26 mole) of diisooctyl terephthalate (DOTP) prepared in Preparation Example 1-2 was used instead of the liquid dibutyl terephthalate (DBTP) prepared in Preparation Example 1-1, and octanol (about 80° C.) was used instead of butanol (about 80° C.) in washing.

Example 3

39.7 g (yield: 92%) of solid terephthalic acid (TPA) was obtained in the same manner as in Example 1, except that 2.04 g (0.052 mole) of NaOH was used.

Example 4

38.4 g (yield: 89%) of solid terephthalic acid (TPA) was obtained in the same manner as in Example 1, except that 2.18 g (0.026 mole) of $NaHCO_3$ was used instead of NaOH.

Example 5

38.9 g (yield: 90%) of solid terephthalic acid (TPA) was obtained in the same manner as in Example 1, except that 2.76 g (0.026 mole) of $Na_2CO_3$ was used instead of NaOH.

Example 6

35.4 g (yield: 82%) of solid terephthalic acid (TPA) was obtained in the same manner as in Example 1, except that 1.40 g (0.026 mole) of NaOMe was used instead of NaOH.

Example 7

40.6 g (yield: 94%) of solid terephthalic acid (TPA) was obtained in the same manner as in Example 1, except that 1.46 g (0.026 mole) of KOH was used instead of NaOH.

Example 8

38.4 g (yield: 89%) of solid terephthalic acid (TPA) was obtained in the same manner as in Example 1, except that 3.59 g (0.026 mole) of $K_2CO_3$ was used instead of NaOH.

Example 9

35.4 g (yield: 82%) of solid terephthalic acid (TPA) was obtained in the same manner as in Example 1, except that 2.92 g (0.026 mole) of KOtBu was used instead of NaOH.

Example 10

39.7 g (yield: 92%) of solid terephthalic acid (TPA) was obtained in the same manner as in Example 1, except that 2.73 g (0.013 mole) of $Na_2TPA$ (disodium terephthalate) was used instead of NaOH.

Example 11

37.1 g (yield: 86%) of solid terephthalic acid (TPA) was obtained in the same manner as in Example 1, except that 6.35 g (0.026 mole) of sodium monobutyl terephthalate was used instead of NaOH.

Example 12

37.4 g (yield: 88%) of solid terephthalic acid (TPA) was obtained in the same manner as in Example 1, except that 45.7 g (0.26 mole) of dimethyl terephthalate (DMT, manufacturer: Sigma Aldrich) was used instead of the liquid dibutyl terephthalate (DBTP) prepared in Preparation Example 1-1, and methanol (hot, about 110° C.) was used instead of butanol in washing.

Example 13

40.8 g (yield: 96%) of solid terephthalic acid (TPA) was obtained in the same manner as in Example 1, except that 65.1 g (0.26 mole) of bis(2-hydroxyethyl) terephthalate (BHET, manufacturer: Sigma Aldrich) was used instead of the liquid dibutyl terephthalate (DBTP) prepared in Preparation Example 1-1, and ethylene glycol (hot) was used instead of butanol (hot) in washing.

Example 14

A second high-pressure reactor with a capacity of 600 ml was charged with 100 g (0.26 mole) of liquid diisooctyl terephthalate (DOTP) prepared in Preparation Example 1-2 and 200 g (11.10 moles) of water, followed by an addition thereto of 1.02 g (0.026 mole, 0.1 mole based on 1 mole of DOTP) of NaOH as a hydrolysis catalyst.

Thereafter, the temperature of the second high-pressure reactor was raised to 260° C., and a hydrolysis reaction was carried out for 4 hours while a temperature of 260° C. was maintained, followed by cooling to room temperature to obtain a hydrolysis reaction product in the form of a slurry. The filtrate obtained by filtering the hydrolysis reaction product in the form of a slurry was subjected to layer separation to obtain a water layer (190 g), which was fed to the second high-pressure reactor again, and 95 g (0.24 mole) of liquid diisooctyl terephthalate (DOTP) prepared in Preparation Example 1-2 was fed thereto, followed by carrying out another hydrolysis reaction at 260° C. It was cooled again to room temperature to obtain a hydrolysis reaction product in the form of a slurry, which was filtered to obtain a solid, which was washed with octanol (about 150° C.) and water (about 90° C.) and dried under vacuum to obtain 36.8 g (yield: 91%) of solid terephthalic acid (TPA). Here, the decomposition rate (%) was calculated by analyzing the components of the filtrate using gas chromatography.

Example 15

A second high-pressure reactor with a capacity of 600 ml was charged with 20 g (0.051 mole) of liquid diisooctyl terephthalate (DOTP) prepared in Preparation Example 1-2 and 400 g (22.20 moles) of water, followed by an addition thereto of 0.20 g (0.0051 mole, 0.1 mole based on 1 mole of DOTP) of NaOH as a hydrolysis catalyst.

Thereafter, the temperature of the second high-pressure reactor was raised to 260° C., and a hydrolysis reaction was carried out for 4 hours while a temperature of 260° C. was maintained, followed by cooling to room temperature to obtain a hydrolysis reaction product in the form of a slurry. The hydrolysis reaction product in the form of a slurry was filtered to obtain a solid, which was washed with octanol (about 120° C.) and water (about 80° C.) and dried under vacuum to obtain 8.4 g (yield: 99%) of solid terephthalic acid (TPA). Here, the decomposition rate (%) was calculated by analyzing the components of the filtrate using gas chromatography.

Comparative Example 1

39.7 g (yield: 92%) of solid terephthalic acid (TPA) was obtained in the same manner as in Example 1, except that 14 mg of $Zn(OAC)_2 \cdot 2H_2O$ as a hydrolysis catalyst was used.

Comparative Example 2

34.1 g (yield: 79%) of solid terephthalic acid (TPA) was obtained in the same manner as in Example 2, except that 20 mg of $Zn(OAC)_2 \cdot 2H_2O$ as a hydrolysis catalyst was used.

Comparative Example 3

36.2 g (yield: 84%) of solid terephthalic acid (TPA) was obtained in the same manner as in Example 13, except that 9.1 mg of $Zn(OAC)_2 \cdot 2H_2O$ as a hydrolysis catalyst was used.

Comparative Example 4

34.6 g (yield: 80%) of solid terephthalic acid (TPA) was obtained in the same manner as in Example 14, except that 13 mg of $Zn(OAC)_2 \cdot 2H_2O$ as a hydrolysis catalyst was used.

Comparative Example 5

39.3 g (yield: 91%) of solid terephthalic acid (TPA) was obtained in the same manner as in Example 1, except that 5.7 g of $Zn(OAC)_2 \cdot 2H_2O$ as a hydrolysis catalyst was used.

Comparative Example 6

35.9 g (yield: 83%) of solid terephthalic acid (TPA) was obtained in the same manner as in Example 2, except that 5.7 g of $Zn(OAC)_2 \cdot 2H_2O$ as a hydrolysis catalyst was used.

Comparative Example 7

37.2 g (yield: 86%) of solid terephthalic acid (TPA) was obtained in the same manner as in Example 13, except that 5.7 g of Zn(OAC)$_2$·2H$_2$O as a hydrolysis catalyst was used.

Comparative Example 8

34.1 g (yield: 79%) of solid terephthalic acid (TPA) was obtained in the same manner as in Example 14, except that 5.7 g of Zn(OAC)$_2$·2H$_2$O as a hydrolysis catalyst was used.

Test Example: Content of Metals

The content (ppm) of metals present in the terephthalic acid in each of Examples 1 to 15 and Comparative Examples 1 to 8 was measured using Inductively Coupled Plasma Atomic Emission Spectroscopy (ICP-AES). N.D. means that the content was too low, less than 1 ppm, to be measured as a specific value.

TABLE 1

| | | Hydrolysis catalyst | | | Decomposition | Content of |
|---|---|---|---|---|---|---|
| | Reactant | type | Used amount | TPA yield (%) | rate of alcohol (%) | metals (ppm) (Sb/Ti/Zn) |
| Ex. 1 | DBTP | NaOH | 0.1 mole | 94 | <1.0 | 1/N.D./3 |
| Ex. 2 | DOTP | NaOH | 0.1 mole | 85 | 1.9 | 2/N.D./4 |
| Ex. 3 | DBTP | NaHCO$_3$ | 0.1 mole | 92 | 1.6 | 13/N.D./5 |
| Ex. 4 | DBTP | Na$_2$CO$_3$ | 0.1 mole | 89 | 2.7 | 14/N.D./3 |
| Ex. 5 | DBTP | NaOMe | 0.1 mole | 90 | 1.1 | 12/N.D./2 |
| Ex. 6 | DBTP | KOH | 0.1 mole | 82 | <1.0 | 5/N.D./1 |
| Ex. 7 | DBTP | K$_2$CO$_3$ | 0.1 mole | 94 | 2.5 | 3/N.D./1 |
| Ex. 8 | DBTP | KOtBu | 0.1 mole | 89 | <1.0 | 5/N.D./1 |
| Ex. 9 | DBTP | NaOH | 0.1 mole | 82 | <1.0 | 12/N.D./1 |
| Ex. 10 | DBTP | Na$_2$(TPA) | 0.05 mole | 92 | <1.0 | 6/N.D./1 |
| Ex. 11 | DBTP | Sodium monobutyl terephthalate | 0.1 mole | 86 | 1.6 | 2/N.D./1 |
| Ex. 12 | DMT | NaOH | 0.1 mole | 88 | <1.0 | 3/N.D./2 |
| Ex. 13 | BHET | NaOH | 0.1 mole | 96 | <1.0 | 4/N.D./3 |
| Ex. 14 | DOTP | NaOH | 0.1 mole | 91 | 2.4 | 1/N.D./2 |
| Ex. 15 | DOTP | NaOH | 0.1 mole | 99 | 1.3 | 8/N.D./1 |
| C. Ex. 1 | DBTP | Zn(OAC)$_2$·2H$_2$O | 200 ppm | 95 | 24.0 | 235/9/86 |
| C. Ex. 2 | DOTP | Zn(OAC)$_2$·2H$_2$O | 200 ppm | 79 | 28.0 | 293/12/98 |
| C. Ex. 3 | DMT | Zn(OAC)$_2$·2H$_2$O | 200 ppm | 84 | 31.0 | 243/23/74 |
| C. Ex. 4 | BHET | Zn(OAC)$_2$·2H$_2$O | 200 ppm | 80 | 22.0 | 257/16/87 |
| C. Ex. 5 | DBTP | Zn(OAC)$_2$·2H$_2$O | 0.1 mole | 91 | 40.1 | 216/18/95 |
| C. Ex. 6 | DOTP | Zn(OAC)$_2$·2H$_2$O | 0.1 mole | 83 | 43.5 | 301/31/92 |
| C. Ex. 7 | DMT | Zn(OAC)$_2$·2H$_2$O | 0.1 mole | 86 | 45.4 | 315/29/102 |
| C. Ex. 8 | BHET | Zn(OAC)$_2$·2H$_2$O | 0.1 mole | 79 | 41.1 | 251/26/79 |

As can be seen from Table 1 above, the recycled terephthalic acid prepared in Examples 1 to 15 was environmentally friendly since it was prepared by adding a hydrolysis catalyst according to the present invention and water and then hydrolyzing it, low in the decomposition rate of alcohol as compared with Comparative Examples 1 to 8, and very low in the content of metals as impurities, resulting in a high yield. In addition, the process for preparing terephthalic acid according to the present invention is environmentally friendly in that the alcohol can be recovered and reused, and process costs can be reduced.

The invention claimed is:

1. A process for preparing terephthalic acid, which comprises:
    hydrolyzing bis (2-hydroxyethyl) terephthalate (BHET) or a compound which is liquid at room temperature and is prepared by depolymerizing waste polyester, wherein the depolymerizing comprises alcoholysis, and the alcoholysis is carried out using an alcohol having 4 or more carbon atoms, and
    wherein a hydrolysis catalyst is used in the hydrolyzing and comprises at least one selected from the group consisting of NaOH, NaHCO3, Na$_2$CO$_3$, NaOMe, KOH, K$_2$CO$_3$, KOtBu, CsOH, Ca(OH)$_2$, LiOH, NH$_4$OH, Na$_2$TPA, and sodium monobutyl terephthalate.

2. The process for preparing terephthalic acid of claim 1, wherein the amount of the hydrolysis catalyst used is 0.01 mole to 1.0 mole based on 1 mole of the compound.

3. The process for preparing terephthalic acid of claim 1, wherein the hydrolysis is carried out at a temperature of 180° C. to 280° C. for 0.5 hour to 24 hours.

4. The process for preparing terephthalic acid of claim 1, wherein water is added in the hydrolysis step, and the water is added in an amount of 1 to 500 times the weight of the compound.

5. The process for preparing terephthalic acid of claim 1, wherein the compound is represented by Formula 1:

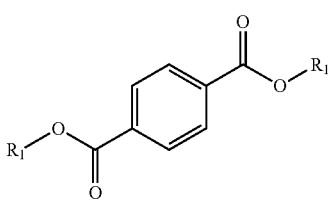

[Formula 1]

in Formula 1, R$_1$ is a substituted or unsubstituted alkyl group.

6. The process for preparing terephthalic acid of claim 5, wherein R$_1$ is an alkyl group unsubstituted or substituted with a hydroxy group, or a substituted or unsubstituted alkyl group having 2 or more carbon atoms.

7. The process for preparing terephthalic acid of claim 5, wherein the compound is dibutyl terephthalate (DBTP), or diisooctyl terephthalate (DOTP).

8. The process for preparing terephthalic acid of claim 1, wherein an alcohol is produced as a by-product in the hydrolysis step, and the decomposition rate of the alcohol is less than 10%.

9. The process for preparing terephthalic acid of claim 1, wherein the weight ratio of the waste polyester to the alcohol in the alcoholysis is 1:1 to 10, and the alcoholysis is carried out at a temperature of 160° C. to 280° C. and a pressure of 1 bar to 40 bar for 0.5 hour to 24 hours.

10. The process for preparing terephthalic acid of claim 1, wherein the process further comprises purifying the compound before the hydrolysis step.

11. The process for preparing terephthalic acid of claim 10, wherein the purification step comprises adding at least one adsorbent selected from the group consisting of activated carbon, silica gel, alumina, zeolite, and activated clay, or adsorption through bed adsorption, and the content of the adsorbent added is 0.1% by weight to 20% by weight based on the total weight of the compound.

12. Recycled terephthalic acid, which is prepared according to a process for preparing terephthalic acid, which comprises:
    hydrolyzing a compound which is liquid at room temperature and is prepared by depolymerizing waste polyester,
    wherein the depolymerizing comprises alcoholysis, and the alcoholysis is carried out using an alcohol having 4 or more carbon atoms, and
    wherein a hydrolysis catalyst is used in the hydrolyzing and comprises at least one selected from the group consisting of NaOH, $NaHCO_3$, $Na_2CO_3$, NaOMe, KOH, $K_2CO_3$, KOtBu, CsOH, Ca $(OH)_2$, LiOH, $NH_4OH$, $Na_2TPA$ and sodium monobutyl terephthalate, and
    wherein the recycled terephthalic acid has a total metal content of less than 100 ppm when measured by inductively coupled plasma atomic emission spectroscopy (ICP-AES).

13. The recycled terephthalic acid of claim 12, wherein the recycled terephthalic acid has a total content of Sb, Ti, and Zn of less than 30 ppm when measured by inductively coupled plasma atomic emission spectroscopy (ICP-AES).

14. The recycled terephthalic acid of claim 12, wherein the recycled terephthalic acid has a color-b of less than 2 as measured with a colorimeter, and
    the yellow index (Y.I.) is less than 2 when the recycled terephthalic acid is diluted to a concentration of 5% in dimethyl sulfoxide (DMSO), dimethyl formamide (DMF), or methylpyrrolidone (NMP), respectively, and measured.

15. A polyester resin, which comprises the recycled terephthalic acid of claim 12.

* * * * *